UNITED STATES PATENT OFFICE.

ALEXANDER ROSS BENSON, OF HUDSON, NEW YORK.

SOLDERING-SALT.

SPECIFICATION forming part of Letters Patent No. 417,309, dated December 17, 1889.

Application filed November 15, 1889. Serial No. 330,442. (No specimens.)

*To all whom it may concern:*

Be it known that I, ALEXANDER ROSS BENSON, of the city of Hudson, in the county of Columbia and State of New York, have invented a certain Compound known as Soldering-Salts, by and through the addition of biborate of soda in definite relative quantities and an improved method of manufacture, of which the following is a specification.

The nature of my improvement consists in producing a pure white salt which can be safely used for soldering meat and fruit cans without injury to their contents, and for all soldering purposes connected with electrical and other manufactures.

The production of this salt is effected in the following improved manner: I take muriatic acid of twenty per cent. proof and put it in earthen jars in a room arranged with a ventilator for the escape of the chlorine gas. I saturate the acid with metallic zinc, leaving it for twelve hours. Then, after having strained this to remove all impurities, I put the solution in a copper vessel and concentrate it by the aid of gentle heat until the acid is driven off and crystallization is about to begin. The fire is then deadened and the mixture is stirred with a copper shovel until it is thoroughly dry and sand-like. I then add muriate of ammonia and biborate of soda, (powdered,) in the proportion of one pound of muriate of ammonia and one-half pound of biborate of soda to the one hundred pounds of the mass. After this is mixed thoroughly and incorporated by stirring I remove the whole from the heat and place it in an earthen jar and cover it with felt to exclude the air. The day after it may be bottled ready for use.

This soldering-salt possesses many advantages over the salts now in use. It is drier and is rendered more soluble by the addition of the biborate of soda, and hence can be more easily and quickly prepared for use. It is free from odor and does not tarnish metals, and does not, like acid, injure the eyes, nose, mouth, or lungs by its deleterious fumes in using. It leaves the metals brighter and cleaner than any compound known to me, causes the solder to flow more freely, and increases the better working of the soldering-irons, (coppers.) To use it for soldering, it is mixed with water in the proportion of one part of the salt to twelve parts of water. For bright tin and for other metals increase the proportion of salt or lessen the quantity of water.

I claim as my invention—

A soldering-salt composed of muriatic acid, metallic zinc, muriate of ammonia, and biborate of soda, substantially in the proportions set forth.

ALEXANDER ROSS BENSON.

Witnesses:
   FREEMAN SKINNER,
   JORDAN PHILIP, Jr.